(12) United States Patent
Ito (10) Patent No.: US 10,871,869 B2
(45) Date of Patent: Dec. 22, 2020

(54) INFORMATION PROCESSING APPARATUS, CONTROL METHOD THEREFOR, AND NON-TRANSITORY COMPUTER-READABLE MEDIUM

(71) Applicant: CANON KABUSHIKI KAISHA, Tokyo (JP)

(72) Inventor: Daisuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 15/234,040

(22) Filed: Aug. 11, 2016

(65) Prior Publication Data

US 2017/0068396 A1 Mar. 9, 2017

(30) Foreign Application Priority Data

Sep. 7, 2015 (JP) ................................ 2015-175889

(51) Int. Cl.
  G06F 3/048 (2013.01)
  G06F 3/0481 (2013.01)
  H04N 1/00 (2006.01)

(52) U.S. Cl.
  CPC ....... *G06F 3/0481* (2013.01); *H04N 1/00411* (2013.01); *H04N 1/00464* (2013.01); *H04N 1/00472* (2013.01)

(58) Field of Classification Search
  CPC ........... H04N 1/00411; H04N 1/00464; H04N 1/00472; H04N 2201/0094
  See application file for complete search history.

(56) References Cited

U.S. PATENT DOCUMENTS

| 5,799,292 A * | 8/1998 | Hekmatpour ......... G06F 3/0481 706/11 |
| 8,724,028 B1 * | 5/2014 | Saijo .................. H04N 5/44543 348/564 |
| 2002/0180792 A1 * | 12/2002 | Broussard ............. G06F 3/0481 715/764 |

(Continued)

FOREIGN PATENT DOCUMENTS

| CN | 102394997 A | 3/2012 |
| CN | 102891948 A | 1/2013 |

(Continued)

OTHER PUBLICATIONS

Chinese Office Action issued in corresponding Chinese Application No. 201610617230.1 dated Sep. 4, 2019.

*Primary Examiner* — Anil N Kumar
(74) *Attorney, Agent, or Firm* — Venable LLP (57) ABSTRACT

An information processing apparatus comprises: a reception unit that receives a pop-up display command of a first object; a determination unit that determines whether a second object whose display order is not secured in a vertical direction with respect to the first object is displayed on a displayed screen; a generation unit that generates, based on image data of the second object, a third object whose display order is secured in the vertical direction with respect to the first object, if the determination unit determines that the second object whose display order is not secured in the vertical direction with respect to the first object is displayed; and a display control unit that sets the second object in a non-display state, and display the first object and the third object.

12 Claims, 8 Drawing Sheets

(56) References Cited

U.S. PATENT DOCUMENTS

| | | | |
|---|---|---|---|
| 2009/0049385 A1* | 2/2009 | Blinnikka | G06F 3/0481 715/719 |
| 2011/0199645 A1 | 8/2011 | Ito | 358/1.15 |
| 2012/0005601 A1 | 1/2012 | Mori | |
| 2012/0084714 A1* | 4/2012 | Sirpal | G06F 1/1616 715/790 |
| 2013/0021277 A1 | 1/2013 | Kasamatsu | |
| 2014/0096158 A1* | 4/2014 | Chao | G06F 3/0481 725/37 |

FOREIGN PATENT DOCUMENTS

| | | |
|---|---|---|
| CN | 104071009 A | 10/2014 |
| JP | 2015-075885 A | 4/2015 |
| WO | 2014192045 A1 | 12/2014 |

\* cited by examiner

INFORMATION PROCESSING APPARATUS, CONTROL METHOD THEREFOR, AND NON-TRANSITORY COMPUTER-READABLE MEDIUM

BACKGROUND OF THE INVENTION

Field of the Invention

The present invention relates to an information processing apparatus, a control method therefor, and a non-transitory computer-readable medium.

Description of the Related Art

Conventionally, an information processing apparatus includes a Web browser and a browser component which has the same function as that of the Web browser and can be used as a GUI element on an application. The application can extend the width of a GUI (Graphical User Interface) representation using the browser component. In recent years, some MFPs (Multi Function Peripherals) serving as image forming apparatuses incorporate the above-described Web browser and browser component. Using these techniques, an application group operating on an MFP can provide, to the user, a GUI representation equivalent to that of an application operating on an information processing apparatus such as a PC or mobile terminal.

A practical example of a method of providing a browser component to an application is a Java® GUI component. In general, there are two types of Java® GUI components, that is, a heavyweight component dependent on the implementation of a lower layer system and a lightweight component independent of the implementation of a lower layer system. In Java®, a browser component is a heavyweight component since it is dependent on the implementation of the HTML (HyperText Markup Language) rendering function of a lower layer system.

A conventional Java application basically uses only lightweight or heavyweight components to create a GUI, thereby keeping the display order of a component group in the vertical direction on a screen. However, along with enhancement in the availability of a Web technique in the market, a GUI including lightweight and heavyweight components is increasingly created using a browser component. When creating a GUI including lightweight and heavyweight components, control of the display order of each component group on the screen in the vertical direction is important. For example, in a Java environment, when using lightweight and heavyweight components, if superimposition is performed with another screen like a pop-up representation, there may be a limitation of displaying the heavyweight component in an upper layer (on the foreground). As a method of avoiding this limitation, there is provided a technique of adjusting the display position of a component so as not to hinder display when lightweight and heavyweight components are superimposed and displayed (for example, pop-up display is performed) (Japanese Patent Laid-Open No. 2015-75885).

However, when the conventional technique is used, the display position is automatically adjusted. This is insufficient as a method of ensuring the display order on the screen in the vertical direction while maintaining the design of the GUI representation of the application.

SUMMARY OF THE INVENTION

According to one aspect of the present invention, there is provided an information processing apparatus comprising: a reception unit configured to receive a pop-up display command of a first object; a determination unit configured to determine whether a second object whose display order is not secured in a vertical direction with respect to the first object is displayed on a displayed screen; a generation unit configured to generate, based on image data of the second object, a third object whose display order is secured in the vertical direction with respect to the first object, if the determination unit determines that the second object whose display order is not secured in the vertical direction with respect to the first object is displayed; and a display control unit configured to set the second object in a non-display state, and display the first object and the third object.

According to another aspect of the present invention, there is provided a control method for an information processing apparatus, comprising: receiving a pop-up display command of a first object; determining whether a second object whose display order is not secured in a vertical direction with respect to the first object is displayed on a displayed screen; generating, based on image data of the second object, a third object whose display order is secured in the vertical direction with respect to the first object, if it is determined in the determining that the second object whose display order is not secured in the vertical direction with respect to the first object is displayed; and setting the second object in a non-display state, displaying the third object, and then pop-up displaying the first object.

According to another aspect of the present invention, there is provided a non-transitory computer-readable medium storing a program for causing a computer to function as: a reception unit configured to receive a pop-up display command of a first object; a determination unit configured to determine whether a second object whose display order is not secured in a vertical direction with respect to the first object is displayed on a displayed screen; a generation unit configured to generate, based on image data of the second object, a third object whose display order is secured in the vertical direction with respect to the first object, if the determination unit determines that the second object whose display order is not secured in the vertical direction with respect to the first object is displayed; and a display control unit configured to set the second object in a non-display state, and display the first object and the third object.

According to another aspect of the present invention, there is provided a control method for an information processing apparatus in which a plurality of display modules for controlling screen display are operable, comprising: in a first display module, as a lightweight component, of the plurality of display modules, determining, when a display command of a first screen controlled by the first display module is accepted, whether a second screen controlled by a second display module of the plurality of display modules is included as a component of a currently displayed screen, and notifying, if it is determined that the second screen is included as the component of the currently displayed screen, the second display module that the first screen is displayed; in the second display module as a heavyweight component, determining, if the notification is accepted from the first display module, whether the second screen is in a display state on the currently displayed screen, and sending, if it is determined that the second screen is in the display state, information about the second screen in the display state to a third display module of the plurality of display modules; in the third display module as a lightweight component, generating, based on the information about the second screen accepted from the second display module, a third screen which corresponds to the second screen and is controlled by the third display module, and displaying the third screen; in the second display module, setting the second screen in a non-display state when the third display module displays the third screen; and in the first display module, displaying the first screen in accordance with the display command when the second display module sets the second screen in the non-display state.

According to another aspect of the present invention, there is provided an information processing apparatus in which a plurality of display modules for controlling screen display are operable, a first display module, as a lightweight component, of the plurality of display modules including a unit configured to determine, when a display command of a first screen controlled by the first display module is accepted, whether a second screen controlled by a second display module of the plurality of display modules is included as a component of a currently displayed screen, and a unit configured to notify, if it is determined that the second screen is included as the component of the currently displayed screen, the second display module that the first screen is displayed, the second display module as a heavyweight component including, a unit configured to determine, if the notification is accepted from the first display module, whether the second screen is in a display state on the currently displayed screen, and a unit configured to send, if it is determined that the second screen is in the display state, information about the second screen in the display state to a third display module of the plurality of display modules, the third display module as a lightweight component including a unit configured to generate, based on the information about the second screen accepted from the second display module, a third screen which corresponds to the second screen and is controlled by the third display module, and a unit configured to display the third screen, the second display module further including a unit configured to set the second screen in a non-display state when the third display module displays the third screen, and the first display module further including a unit configured to display the first screen in accordance with the display command when the second display module sets the second screen in the non-display state.

According to another aspect of the present invention, there is provided a non-transitory computer-readable medium storing a program for causing a computer to function as a first display module as a lightweight component, a second display module as a heavyweight component, and a third display module as a lightweight component, comprising: in the first display module, determining, when a display command of a first screen controlled by the first display module is accepted, whether a second screen controlled by the second display module is included as a component of a currently displayed screen, and notifying, if it is determined that the second screen is included as the component of the currently displayed screen, the second display module that the first screen is displayed; in the second display module, determining, if the notification is accepted from the first display module, whether the second screen is in a display state on the currently displayed screen, and sending, if it is determined that the second screen is in the display state, information about the second screen in the display state to the third display module; in the third display module, generating, based on the information about the second screen accepted from the second display module, a third screen which corresponds to the second screen and is controlled by the third display module, and displaying the third screen; in the second display module, setting the second screen in a non-display state when the third display module displays the third screen; and in the first display module, displaying the first screen in accordance with the display command when the second display module sets the second screen in the non-display state.

According to the present invention, it is possible to secure a display order on a screen even in an environment in which heavyweight and lightweight components coexist as elements forming the GUI of a Java application.

Further features of the present invention will become apparent from the following description of exemplary embodiments (with reference to the attached drawings).

DESCRIPTION OF THE EMBODIMENTS

An embodiment for carrying out the present invention will be described below with reference to the accompanying drawings.

<System Configuration>

Figure 1:
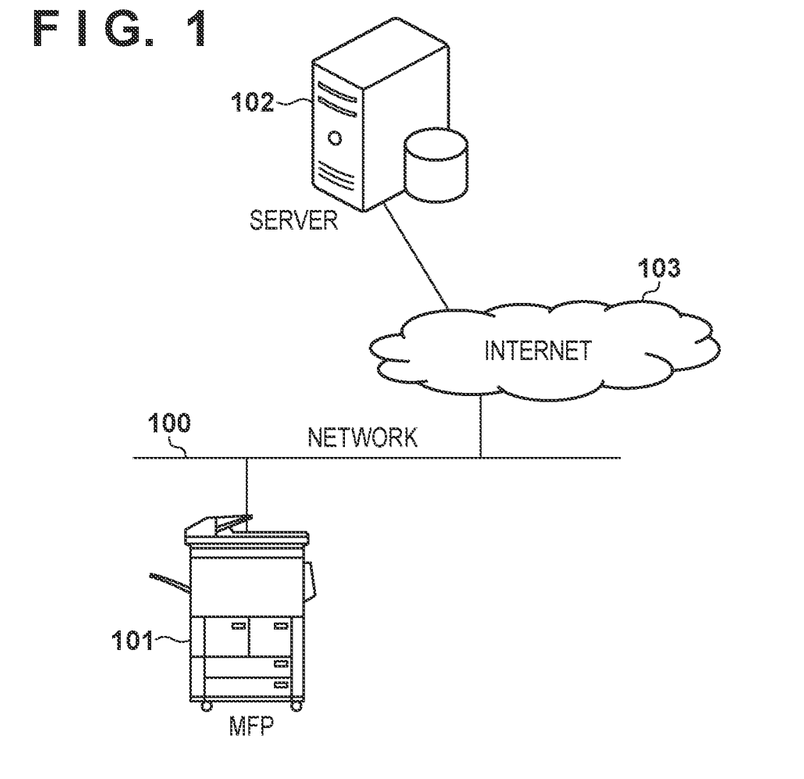
FIG. 1 is a view showing an example of a system configuration according to the present invention.

FIG. 1 shows an example of the configuration of a system using an image processing apparatus according to the present invention. This system is formed by including an MFP 101 and a server 102 which are connected via a network 100. The network 100 is a base for performing communication between the apparatuses, and is connected to the Internet 103. The MFP 101 serves as an image forming apparatus, and has a Web browser function. Note that the present invention is not limited to the MFP, and other apparatuses such as a network printer having the Web browser function may be used. Furthermore, the MFP 101 may be managed by a local IP address. In this case, there exists a gateway (not shown) between the network 100 and the MFP 101, and the gateway performs address translation. For example, the gateway includes a router. The gateway or the MFP 101 may have a firewall function. The server 102 serves as an information processing apparatus, and has a function of distributing a Web content via the network. In this example, the server 102 returns a Web content in response to a request from the MFP 101. The respective apparatuses and network need not always be connected to the Internet, and may exist on a local network. Furthermore, FIG. 1 shows one server 102 and one MFP 101. However, a plurality of servers 102 and a plurality of MFPs 101 may be included in the system.

Figure 2:
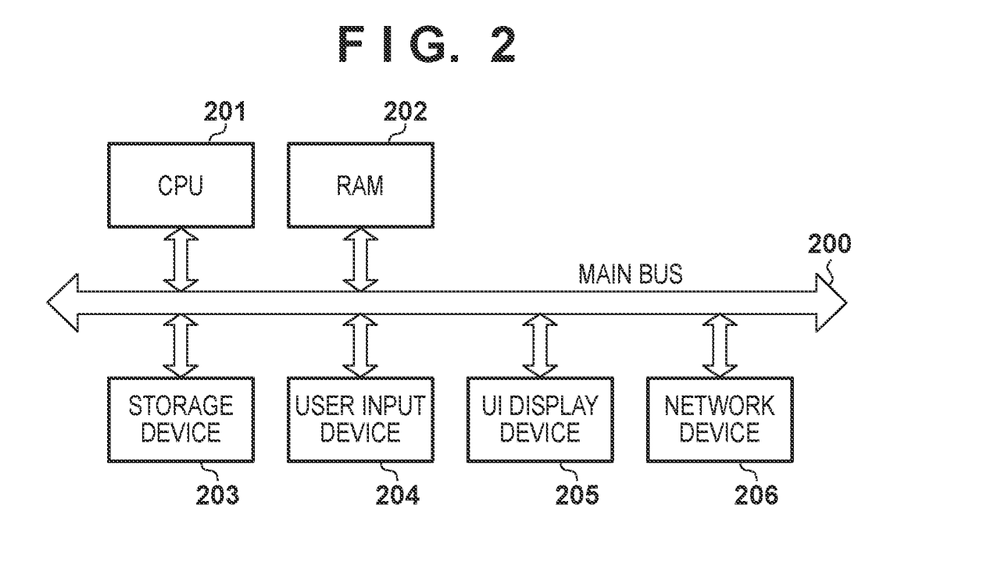
FIG. 2 is a block diagram showing an example of the hardware arrangement of an apparatus according to the present invention.

FIG. 2 shows an example of the basic hardware arrangement of each apparatus according to this embodiment. Each apparatus is formed by including a CPU 201 for controlling the apparatus, a RAM 202 for providing a work area of the CPU 201, and a storage device 203 for storing various programs and various settings. Examples of the storage device 203 are an HDD, SSD, and NVRAM. Furthermore, each apparatus is formed by including a user input device 204 used by the user to input a command, a UI display device 205 for displaying a screen, and a network device 206 for performing communication with another apparatus via the network. The respective components of each apparatus are configured to communicate with each other via a main bus 200. Note that in this embodiment, in each of the MFP 101 and the server 102, the CPU 201 controls the RAM 202, storage device 203, user input device 204, UI display device 205, and network device 206 via the main bus 200 unless otherwise specified. Furthermore, the UI display device 205 may also serve as the user input device 204, like a touch panel display. The server 102 need not include the user input device 204 and UI display device 205. In the MFP 101, an image reading device and image printing device (neither of which is shown) may be additionally connected to the main bus 200.

Figure 3:
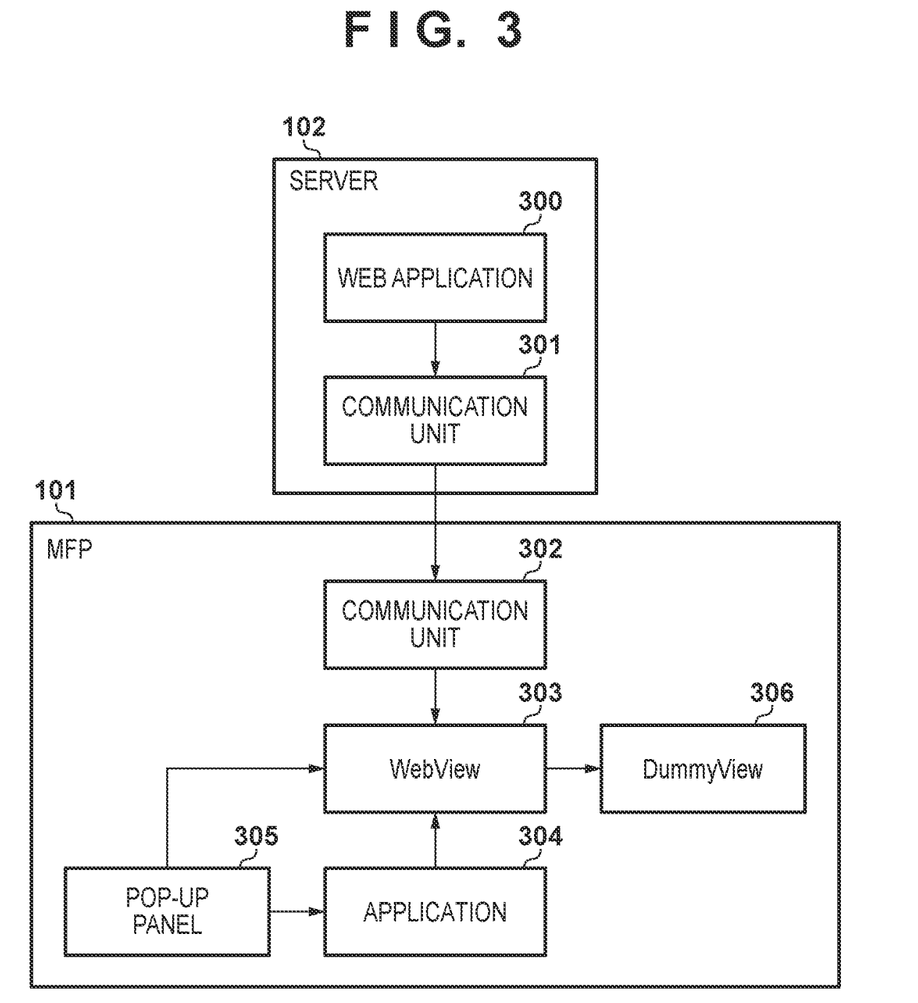
FIG. 3 is a block diagram showing the software arrangement of a system according to the present invention.

FIG. 3 shows an example of the software arrangement of the overall system according to this embodiment. Each functional unit shown in FIG. 3 is implemented when the CPU 201 of the MFP 101 or server 102 reads out a control program from a storage unit, and executes it.

The server 102 includes a Web application 300 and a communication unit 301. The Web application 300 can perform HTTP communication with the MFP 101 via the communication unit 301 as a module for performing communication by HTTP. For example, the Web application 300 sends, as a response to a request from the MFP 101, an operation screen or result screen to be displayed on the screen of the MFP 101. Furthermore, the Web application 300 receives, from the MFP 101 via the communication unit 301, input information which has been input by the user via the operation screen of the MFP 101, and creates, for example, a processing request for executing the device function (not shown) of the MFP 101.

The MFP 101 includes a communication unit 302, a WebView 303, an application 304, a pop-up panel 305, and a DummyView 306. In this embodiment, each of the WebView 303, pop-up panel 305, and DummyView 306 functions as a display module for controlling display of the screen. Furthermore, in this embodiment, the MFP 101 includes a Java environment (not shown) in which the display modules and the application 304 are operable. The WebView 303 is a heavyweight component used by the application 304, and performs HTTP communication with the server 102 via the communication unit 302 as a module for performing communication by HTTP. The WebView 303 has a browser function of displaying, on the MFP 101, various contents acquired from the server 102 by HTTP communication. Note that a content to be displayed is not limited to that provided by the server 102. Similarly, the form of the server 102 is not limited to the Web server for sending/receiving a request/response in accordance with HTTP.

The application 304 is an application operating on the MFP 101. The application 304 serves as a GUI component to generate a display screen using the pop-up panel 305, WebView 303, and DummyView 306. The pop-up panel 305 is a lightweight component used by the application 304, and has a function of performing pop-up display in accordance with a command of the application 304. Furthermore, the pop-up panel 305 can mutually communicate with the WebView 303. The DummyView 306 is a lightweight component used by the application 304, and has a function of receiving an image displayed by the WebView 303 and displaying it on the component of itself.

Figure 4A:
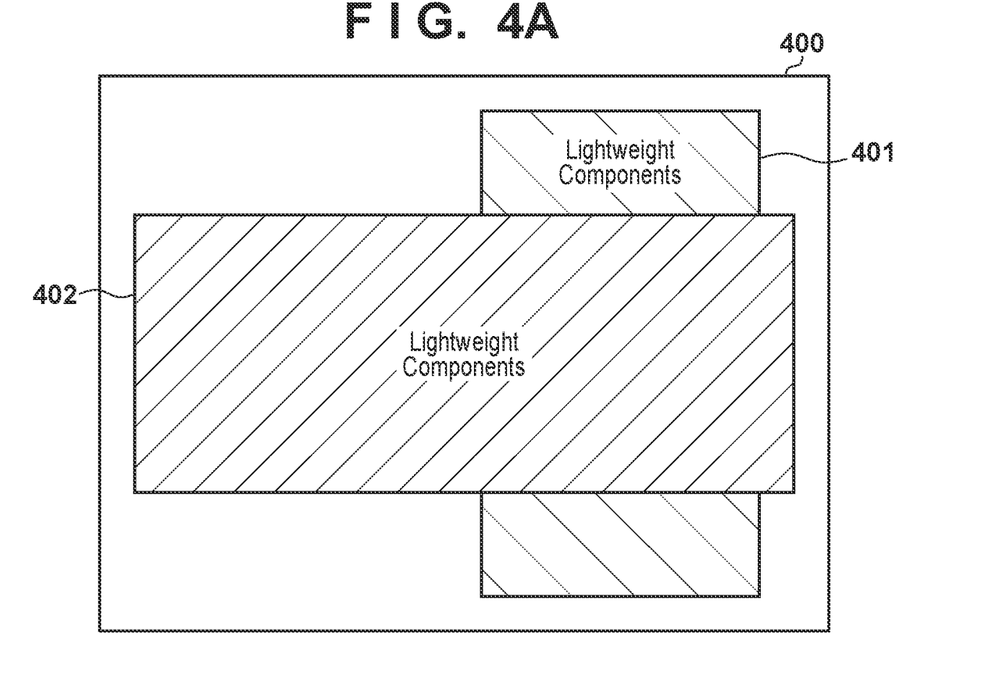
FIGS. 4A and 4B are schematic views each showing GUI components according to the present invention.

FIGS. 4A and 4B are schematic views each representing the limitation of GUI components according to the embodiment of the present invention. Consider a case in which lightweight components 402 are pop-up displayed on display of a Java application 400 on which lightweight components 401 are arranged, as shown in FIG. 4A. In this case, the display is formed by only the lightweight components, and thus the display order in the vertical direction is secured. That is, on the display of the Java application 400, the lightweight components 402 are pop-up displayed on the foreground.

Figure 4B:
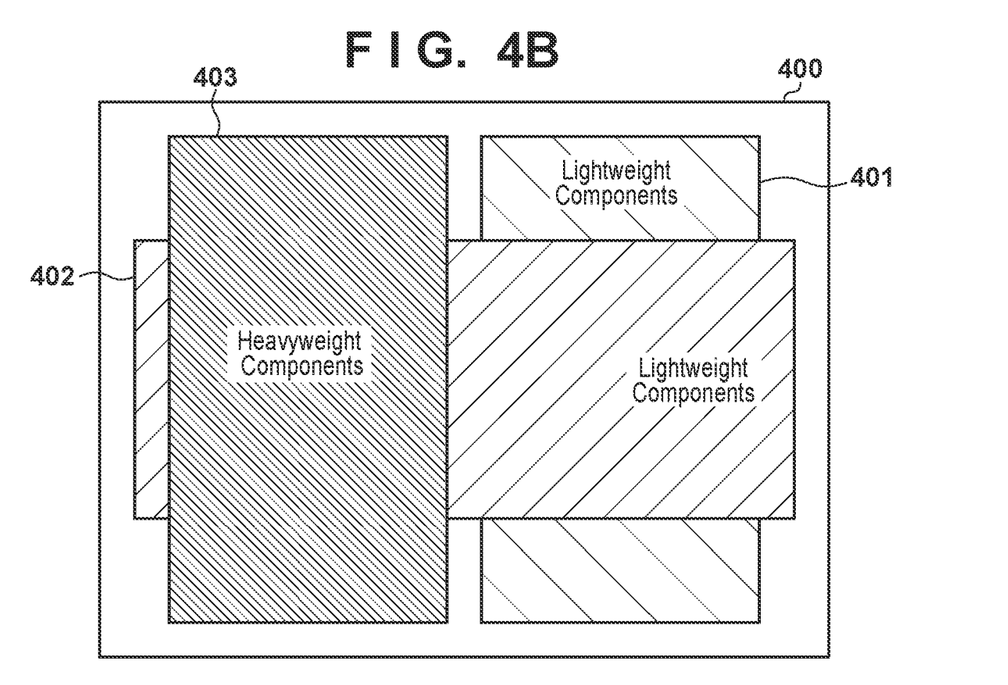

On the other hand, consider a case in which the lightweight components 402 are pop-up displayed on the display of the Java application 400 which uses both the types of components to arrange the lightweight components 401 and heavyweight components 403, as shown in FIG. 4B. In this case, the heavyweight components 403 are always displayed on the foreground depending on the Java environment, and there is a limitation which does not secure the display order in the vertical direction. That is, even if the lightweight components 402 are pop-up displayed, the heavyweight components 403 are displayed on the foreground on the display of the Java application 400.

Figure 5A:
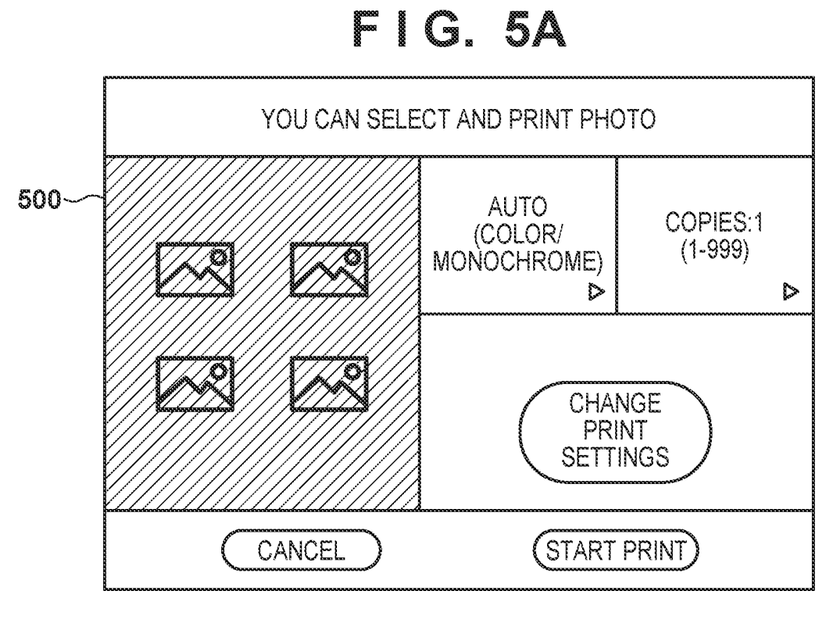
FIGS. 5A and 5B are views each showing a screen display example according to the present invention.
Figure 5B:
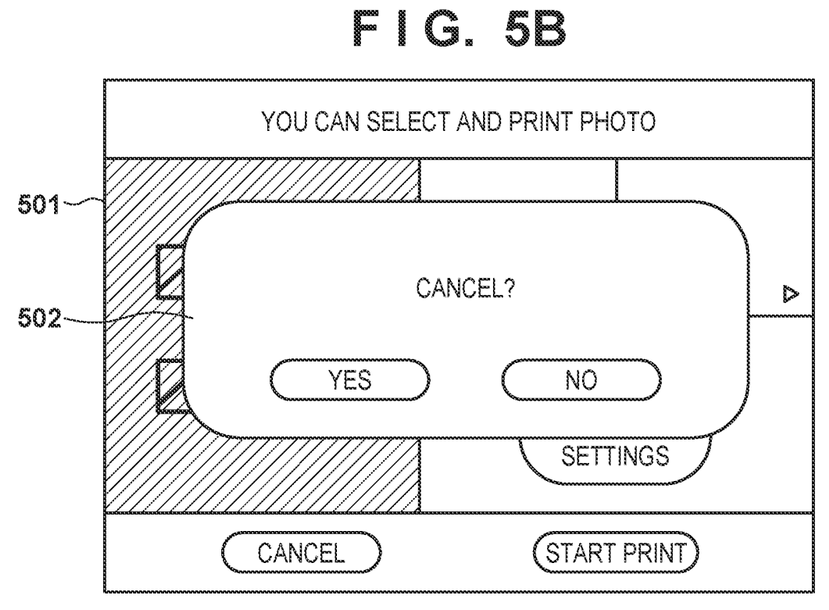

FIGS. 5A and 5B each show a screen display example when still images are used according to the embodiment of the present invention. This display is controlled by performing a flowchart shown in FIG. 7. For example, as shown in FIG. 5A, a WebView example 500 is displayed on the screen before pop-up display. At this time, the WebView 303 as a heavyweight component displays the WebView example 500 on the screen. After that, when performing pop-up display, the DummyView 306 as a lightweight component displays, instead of the WebView example 500, a DummyView example 501 at a position where the WebView example 500 has been displayed. This eliminates the display by the WebView 303 as a heavyweight component at the time of pop-up display, and a pop-up 502 is displayed on the foreground.

Figure 6A:
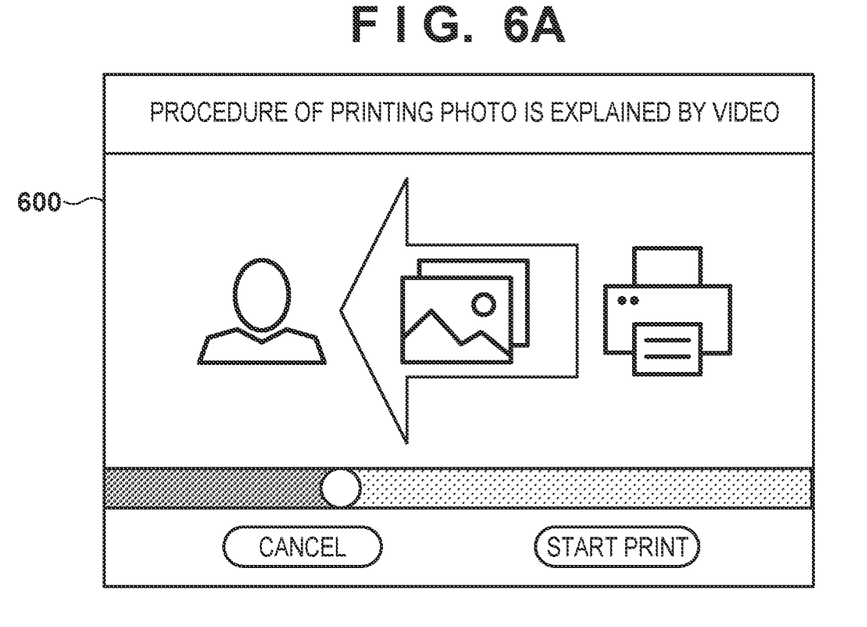
FIGS. 6A and 6B are views each showing a screen display example of a video according to the present invention.
Figure 6B:
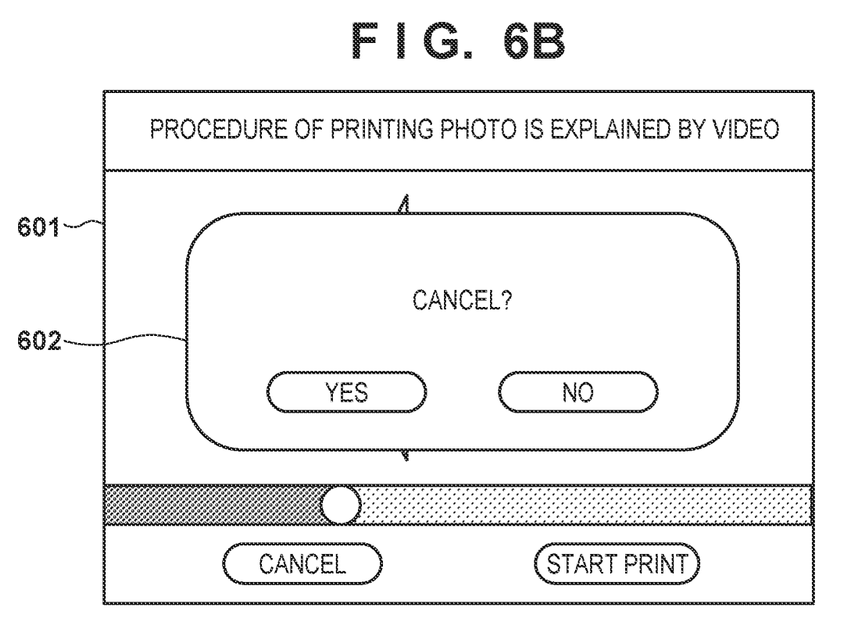

FIGS. 6A and 6B each show a screen display example when a video is used according to the embodiment of the present invention. This display is controlled by performing the flowchart shown in FIG. 7 and flowcharts shown in FIGS. 9A and 9B. For example, as shown in FIG. 6A, a video is displayed on a WebView example 600 before pop-up display on the screen. At this time, the WebView 303 as a heavyweight component displays the WebView example 600 on the screen. After that, as shown in FIG. 6B, when performing pop-up display, the DummyView 306 displays, instead of the WebView example 600, at a position where the WebView example 600 has been displayed, a DummyView example 601 as an image (still image) obtained by pausing the video. This eliminates the display by the WebView 303 as a heavyweight component at the time of pop-up display, and a pop-up 602 is displayed on the foreground.

[Processing Sequence]
(Upon Pop-Up Display)

Figure 7:
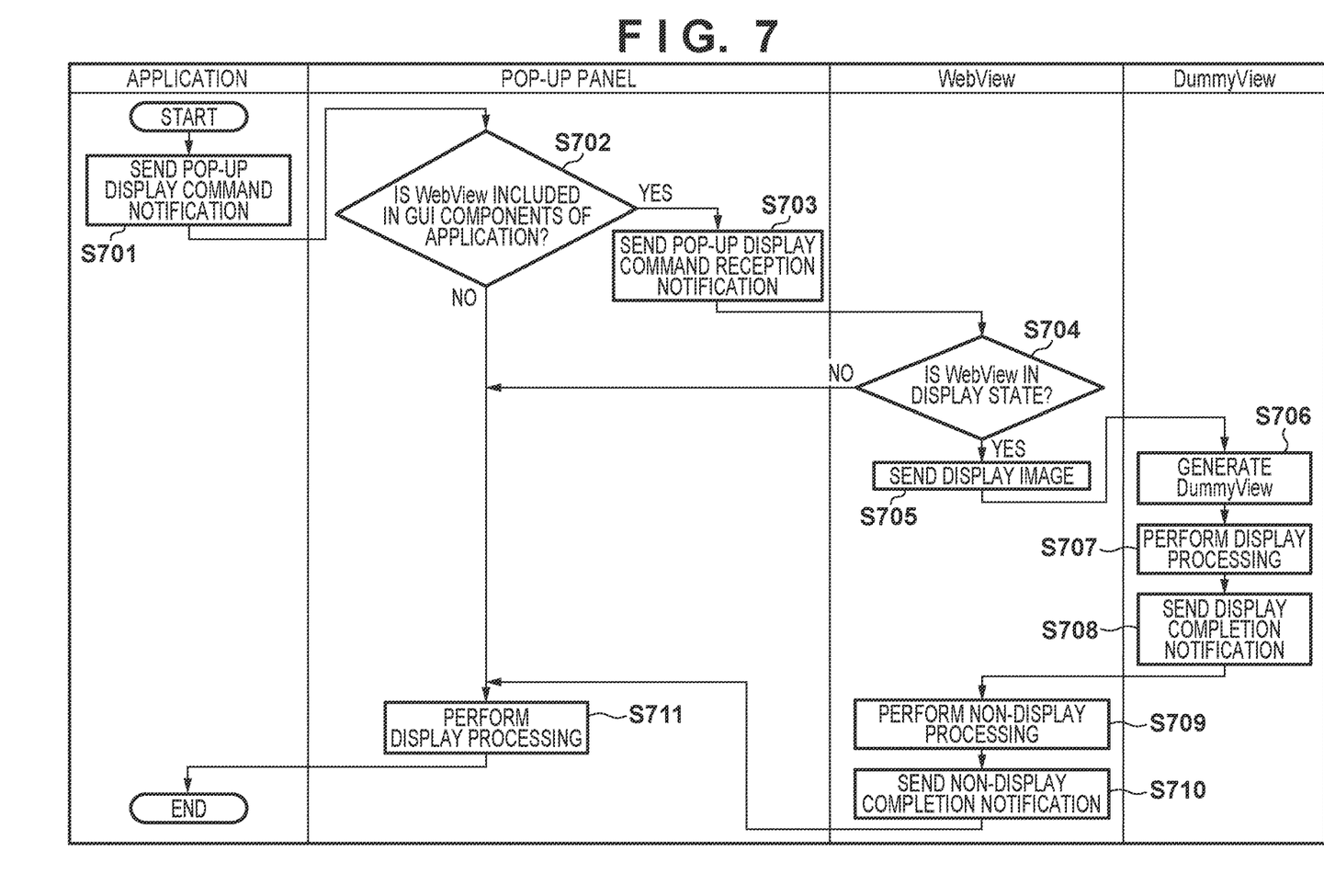
FIG. 7 is a flowchart illustrating pop-up display processing according to the present invention.

FIG. 7 is a flowchart illustrating pop-up display processing according to the present invention. This embodiment assumes that the GUI components of the application 304 are created by lightweight components including the pop-up panel 305 except for the WebView 303 as a heavyweight component. Each process is implemented when the CPU 201 of the MFP 101 reads out the program of each module and executes it. This processing sequence starts when the application 304 displayed on the UI display device 205 of the MFP 101 enters a state in which pop-up display by the pop-up panel 305 is performed.

In step S701, the application 304 notifies the pop-up panel 305 of a display command.

In step S702, the pop-up panel 305 confirms the GUI components of the application 304, and determines whether the GUI components include the WebView 303 (that is, the heavyweight component). The GUI components of the application 304 indicate components included in a GUI screen corresponding to the application 304 currently displayed on the UI display device 205 of the MFP 101. If no WebView 303 is included (NO in step S702), the process advances to step S711; otherwise (YES in step S702), the process advances to step S703.

In step S703, the pop-up panel 305 notifies the WebView 303 that the display command has been received from the application 304. At this time, the pop-up panel 305 records information indicating that the notification has been sent.

In step S704, the WebView 303 determines whether it is in a display state or non-display state. If the WebView 303 is in the non-display state (NO in step S704), the process advances to step S711; otherwise (YES in step S704), the process advances to step S705.

In step S705, the WebView 303 sends image data displayed by itself to the DummyView 306.

In step S706, the DummyView 306 generates an entity of itself using the received image data. Assume that the generated entity is an image of equivalent contents corresponding to the screen displayed by the WebView 303, as described with reference to FIG. 5A.

In step S707, the DummyView 306 performs display processing of itself. That is, the DummyView 306 displays, on the screen, the entity generated in step S706.

In step S708, the DummyView 306 notifies the WebView 303 of the completion of the display processing of itself.

In step S709, upon receiving the notification indicating the completion of the display processing of the DummyView 306, the WebView 303 performs non-display processing of itself. That is, at this time, the WebView 303 as a heavyweight component is not displayed temporarily, and the corresponding DummyView 306 is displayed instead. The WebView 303 records the information of the screen set in the non-display state.

In step S710, the WebView 303 notifies the pop-up panel 305 of the completion of the non-display processing of itself.

In step S711, the pop-up panel 305 performs display processing of itself. That is, at this time, the displayed screen is displayed by lightweight components, and the display order in the vertical direction with respect to the screen is ensured. As a result, the display shown in FIG. 5B becomes possible. This processing sequence ends.

Figure 9A:
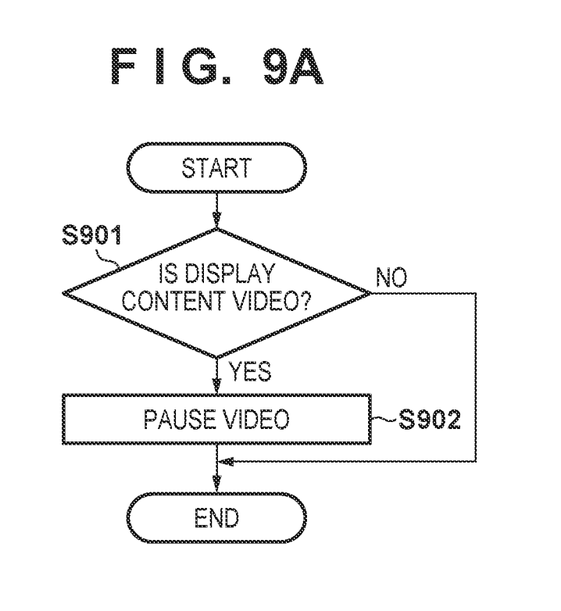
FIGS. 9A and 9B are flowcharts each illustrating control processing at the time of video display according to the present invention.

Furthermore, processing when the WebView 303 displays a video, as described with reference to FIGS. 6A and 6B, will be explained. In this case, processing shown in FIG. 9A is performed between steps S704 and S705 of FIG. 7.

If YES is determined in step S704, the WebView 303 determines in step S901 whether the display content of the WebView 303 at this time is a video. If the display content is a video (YES in step S901), the process advances to step S902; otherwise (NO in step S901), this processing sequence ends, and the process advances to step S705.

In step S902, the WebView 303 pauses the displayed video. At this time, the WebView 303 records information (pause position and the like) about the pause of the video. After that, this processing sequence ends, and the process advances to step S705.

(Upon Pop-Up Non-Display)

Figure 8:
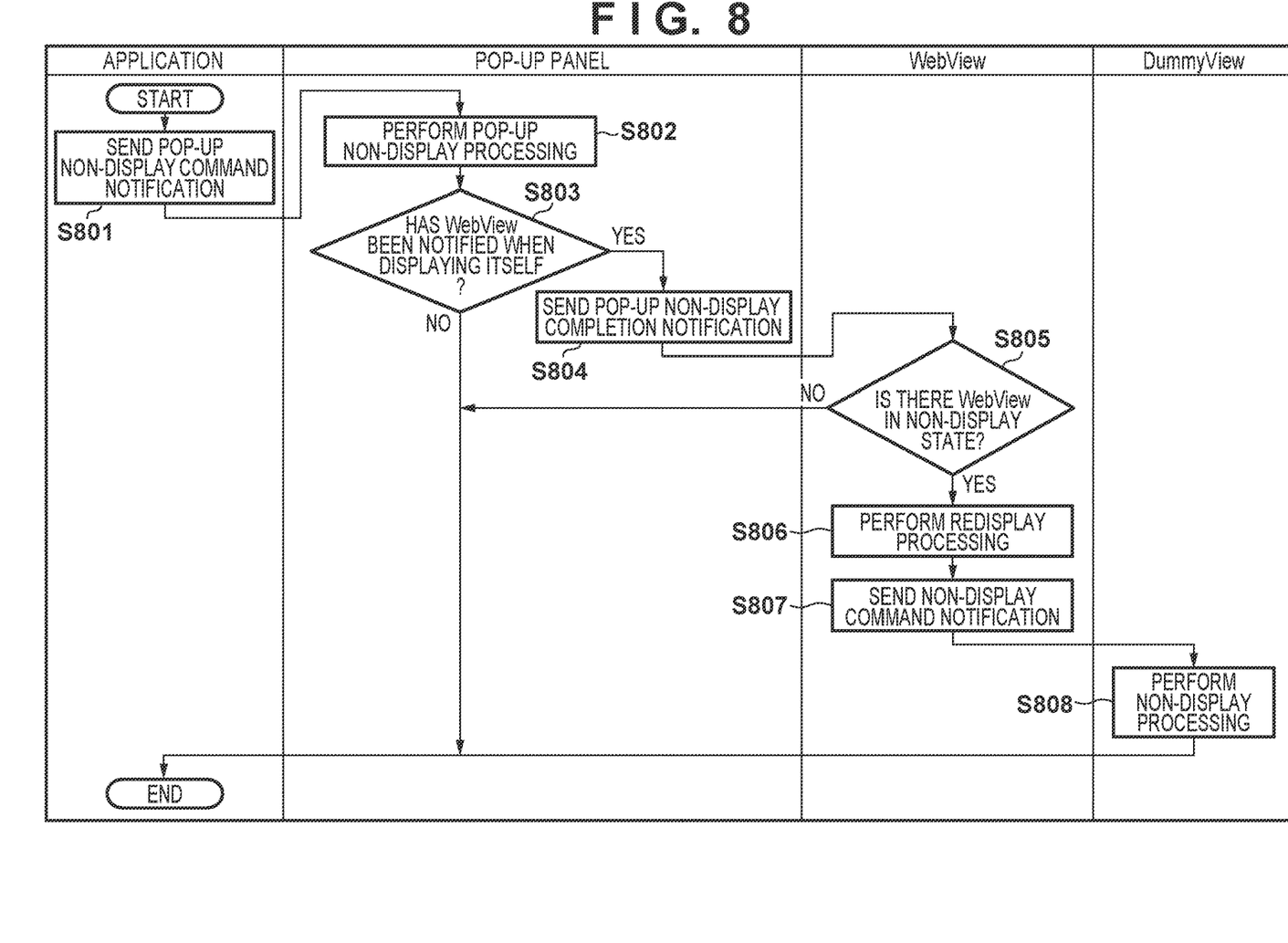
FIG. 8 is a flowchart illustrating pop-up non-display processing according to the present invention.

FIG. 8 is a flowchart illustrating pop-up non-display processing according to the present invention. Each process is implemented when the CPU 201 of the MFP 101 reads out the program of each module and executes it. This processing sequence starts when the application 304 displayed on the UI display device 205 of the MFP 101 enters a state in which the pop-up by the pop-up panel 305 is set in the non-display state. This state is assumed to be, for example, a case in which various buttons included in the screen which has been pop-up displayed are pressed.

In step S801, the application 304 notifies the pop-up panel 305 of a non-display command.

In step S802, the pop-up panel 305 performs non-display processing of itself.

In step S803, the pop-up panel 305 determines whether it has notified the WebView 303 when performing display processing of itself. More specifically, based on the information recorded at the time of execution of the processing in step S703, the pop-up panel 305 determines whether step S703 of FIG. 7 has been performed. If no notification has been sent (NO in step S803), the process ends; otherwise (YES in step S803), the process advances to step S804.

In step S804, the pop-up panel 305 notifies the WebView 303 of the completion of the non-display processing of itself.

In step S805, the WebView 303 determines whether there is a screen in the non-display state as an entity of itself. This determination processing is performed using the information recorded in step S709 of FIG. 7. If there is no entity in the non-display state (NO in step S805), this processing sequence ends; otherwise (YES in step S805), the process advances to step S806.

In step S806, the WebView 303 performs redisplay processing of the entity of itself in the non-display state.

In step S807, the WebView 303 notifies the DummyView 306 of a non-display command.

In step S808, the DummyView 306 performs non-display processing of the screen which corresponds to the screen of the WebView 303 (that is, the heavyweight component) and has been displayed by itself. This processing sequence ends.

Figure 9B:
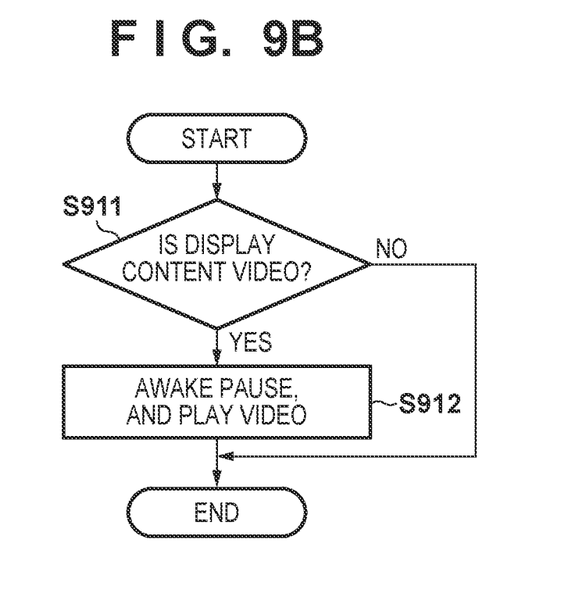

Furthermore, processing when the WebView 303 displays a video, as described with reference to FIGS. 6A and 6B, even in the pop-up non-display processing will be explained. In this case, processing shown in FIG. 9B is performed between steps S805 and S806 of FIG. 8.

If YES is determined in step S805, the WebView 303 determines in step S911 whether the display content of the WebView 303 in the non-display state is a video. If the display content is a video (YES in step S911), the process advances to step S912; otherwise (NO in step S911), this processing sequence ends, and the process advances to step S806.

In step S912, the WebView 303 awakes the pause of the video in the non-display state, and plays the video. When playing the video, the video may be played based on the information (the pause position) held in step S902, or the video may played from a predetermined position (for example, the beginning of the video or a predetermined break position). After that, this processing sequence ends, and the process advances to step S806.

As described above, according to this embodiment, even in an environment in which elements forming the GUI of the Java application include heavyweight and lightweight components, the display order is secured by temporarily changing the components to include only lightweight components. This can provide an appropriate GUI representation to the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-175889, filed Sep. 7, 2015, which is hereby incorporated by reference herein in its entirety.

What is claimed is:

1. An image processing apparatus comprising:
one or more processors; and
a memory storing instructions, which when executed by the one or more processors, cause the image processing apparatus to perform operations comprising:
receiving a display command of a second object that is a second type component and should be displayed on a foreground;
determining whether or not a first object that is a first type component which should be displayed in front of the second type component is included in objects displayed on a display screen;
based on the result of the determination as to whether or not the first object that is the first type component which should be displayed in front of the second type component is included in objects displayed on the display screen, controlling whether to hide the first object that is the first type component which should be displayed in front of the second type component when displaying the second object that is the second type component,
wherein in a case where it is determined in the determination that the first object that is the first type component which should be displayed in front of the second type component is included in objects displayed on the display screen, the first object that is the first type component displayed on the display screen is hidden, and a third object that indicates contents of the first object and is the second type object is displayed, and further the second object that is the second type component is displayed on the foreground;
holding information regarding the object that has been hidden in the case where the first object that is the first type component which should be displayed in front of the second type component is hidden when the second object that is the second type of component is displayed on the foreground;
obtaining a command to hide the second object displayed on the foreground;
determining whether or not there is an object that has been hidden when the second object was displayed on the display screen based on the held information;
redisplaying the first object that is the first type component that has been hidden and hiding the third object that is the second type component when the second object that is the second type component is hidden in a case where it is determined in the determination that there is an object that has been hidden when the second object was displayed on the display screen based on the held information.

2. The image forming apparatus according to claim 1, wherein
the instructions, when executed by the one or more processors, further cause the image processing apparatus to perform operations comprising:
setting the second object that is the second type component to a non-display state, and further displaying the first object that is the first type component in place of the third object which has display contents equivalent to the first object and is the second type component.

3. The image forming apparatus according to claim 1, wherein
an image of the third object is generated based on an image of the first object.

4. The image forming apparatus according to claim 1, wherein
the first type component is a WebView.

5. A control method of an image processing apparatus, comprising:
receiving a display command of a second object that is a second type component and should be displayed on a foreground;
determining whether or not a first object that is a first type component which should be displayed in front of the second type component is included in objects displayed on a display screen;
based on the result of the determination as to whether or not the first object that is the first type component which should be displayed in front of the second type component is included in objects displayed on the display screen, controlling whether to hide the first object that is the first type component which should be displayed in front of the second type component when displaying the second object that is the second type component,
wherein in a case where it is determined in the determination that the first object that is the first type component which should be displayed in front of the second type component is included in objects displayed on the display screen, the first object that is the first type component displayed on the display screen is hidden, and a third object that indicates contents of the first object and is the second type object is displayed, and further the second object that is the second type component is displayed on the foreground;

holding information regarding the object that has been hidden in the case where the first object that is the first type component which should be displayed in front of the second type component is hidden when the second object that is the second type of component is displayed on foreground;

obtaining a command to hide the second object displayed on the foreground;

determining whether or not there is an object that has been hidden when the second object was displayed on the display screen based on the held information;

redisplaying the first object that is the first type component that has been hidden and hiding the third object that is the second type component when the second object that is the second type component is hidden in a case where it is determined in the determination that there is an object that has been hidden when the second object was displayed on the display screen based on the held information.

6. The method according to claim 5, further comprising:
setting the second object that is the second type of component to a non-display state, and further displaying the first object that is the first type of component in place of the third object which has display contents equivalent to the first object and is the second type of component.

7. The method according to claim 5, wherein
an image of the third object is generated based on an image of the first object.

8. The method according to claim 5, wherein
the first type component is a WebView.

9. A non-transitory computer-readable medium storing a program for causing a computer to perform a method comprising:

receiving a display command of a second object that is a second type component and should be displayed on a foreground;

determining whether or not a first object that is a first type component which should be displayed in front of the second type component is included in objects displayed on a display screen;

based on the result of the determination as to whether or not the first object that is the first type component which should be displayed in front of the second type component is included in objects displayed on the display screen, controlling whether to hide the first object that is the first type component which should be displayed in front of the second type component when displaying the second object that is the second type component, wherein in a case where it is determined in the determination that the first object that is the first type component which should be displayed in front of the second type component is included in objects displayed on the display screen, the first object that is the first type component displayed on the display screen is hidden, and a third object that indicates contents of the first object and is the second type object is displayed, and further the second object that is the second type component is displayed on the foreground;

holding information regarding the object that has been hidden in the case where the first object that is the first type component which should be displayed in front of the second type component is hidden when the second object that is the second type of component is displayed on foreground;

obtaining a command to hide the second object displayed on the foreground;

determining whether or not there is an object that has been hidden when the second object was displayed on the display screen based on the held information;

redisplaying the first object that is the first type component that has been hidden and hiding the third object that is the second type component when the second object that is the second type component is hidden in a case where it is determined in the determination that there is an object that has been hidden when the second object was displayed on the display screen based on the held information.

10. The medium according to claim 9, further comprising:
setting the second object that is the second type of component to a non-display state, and further displaying the first object that is the first type of component in place of the third object which has display contents equivalent to the first object and the second type of component.

11. The medium according to claim 9, wherein
an image of the third object is generated based on an image of the first object.

12. The medium according to claim 9, wherein
the first type component is a WebView.

* * * * *